(12) United States Patent
Takatani (10) Patent No.: US 9,621,754 B2
(45) Date of Patent: Apr. 11, 2017

(54) IMAGE FORMING APPARATUS, METHOD, AND MEDIUM FOR AFFECTING STARTUP

(71) Applicant: CANON KABUSHIKI KAISHA, Tokyo (JP)

(72) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/888,074

(22) Filed: May 6, 2013

(65) Prior Publication Data
US 2013/0250336 A1    Sep. 26, 2013

Related U.S. Application Data

(63) Continuation of application No. PCT/JP2012/078833, filed on Nov. 7, 2012.

(30) Foreign Application Priority Data

Nov. 8, 2011    (JP) .................. 2011-244671

(51) Int. Cl.
*H04N 1/00* (2006.01)
*G03G 15/00* (2006.01)

(52) U.S. Cl.
CPC ..... *H04N 1/00904* (2013.01); *G03G 15/5004* (2013.01); *H04N 1/00928* (2013.01); *H04N 1/00931* (2013.01)

(58) Field of Classification Search
CPC ....... B41J 29/38; H04N 1/00904; H04N 1/00; G03G 15/5004; G03G 21/00; G03G 21/14; G06F 3/1202; G06K 15/18

USPC ............... 358/1.13, 1.15; 399/24, 43, 53, 77
See application file for complete search history.

(56) References Cited

U.S. PATENT DOCUMENTS

| 6,931,220 | B2* | 8/2005 | Nakaya | G03G 15/5004 219/216 |
|---|---|---|---|---|
| 7,065,307 | B2* | 6/2006 | Takahashi | G03G 15/205 399/53 |
| 7,210,031 | B2* | 4/2007 | Kashiwada | G06F 1/3203 358/444 |
| 7,978,992 | B2* | 7/2011 | Okunishi | G03G 15/55 399/24 |
| 2003/0196137 | A1* | 10/2003 | Ahmad | G06F 11/1441 714/13 |
| 2004/0234286 | A1* | 11/2004 | Takahashi | G03G 15/205 399/53 |
| 2005/0132181 | A1* | 6/2005 | Kashiwada | G06F 1/3203 713/100 |

(Continued)

FOREIGN PATENT DOCUMENTS

| CN | 101860639 A | 10/2010 |
|---|---|---|
| EP | 2096855 A1 | 9/2009 |

(Continued)

*Primary Examiner* — Tammy Paige Goddard
*Assistant Examiner* — Edwin S Leland, III
(74) *Attorney, Agent, or Firm* — Canon U.S.A., Inc. IP Division (57) ABSTRACT

The present invention relates to an image forming apparatus which has a controller and an image forming unit, and which has multiple startup modes including a first startup mode and a second startup mode as startup modes for the controller. The startup time period for the second startup mode is shorter than that for the first startup mode.

13 Claims, 5 Drawing Sheets

(56) References Cited

U.S. PATENT DOCUMENTS

| | | | | |
|---|---|---|---|---|
| 2007/0013790 A1* | 1/2007 | Nakase | ................ | H04N 5/772 348/231.99 |
| 2007/0053701 A1* | 3/2007 | Nagata | ................ | G03G 15/502 399/24 |
| 2008/0002232 A1* | 1/2008 | Mori | ................ | H04N 1/00885 358/401 |
| 2008/0201594 A1* | 8/2008 | Narushima | ............ | G06F 1/266 713/324 |
| 2008/0310874 A1* | 12/2008 | Mori | ................ | G03G 15/5087 399/77 |
| 2009/0080022 A1* | 3/2009 | Tsutsumi | ............ | G06F 3/1204 358/1.15 |
| 2009/0310990 A1* | 12/2009 | Okunishi | ............... | G03G 15/55 399/43 |
| 2009/0322958 A1* | 12/2009 | Toriyama | ........... | G03G 15/5012 348/714 |
| 2010/0046978 A1* | 2/2010 | Suzuki | ............... | G03G 15/5004 399/88 |
| 2010/0118331 A1* | 5/2010 | Murata | ............. | G03G 15/5004 358/1.15 |
| 2010/0195150 A1* | 8/2010 | Takahashi | .......... | G03G 15/5004 358/1.15 |
| 2011/0026062 A1* | 2/2011 | Takatani | ............. | G06F 11/0757 358/1.13 |
| 2011/0037821 A1* | 2/2011 | Brewington | ........ | B41M 7/0009 347/179 |
| 2011/0037999 A1* | 2/2011 | Sano | ................ | G03G 15/5012 358/1.15 |
| 2012/0008165 A1* | 1/2012 | Tanaka | ................ | G06F 9/4418 358/1.15 |

FOREIGN PATENT DOCUMENTS

| | | |
|---|---|---|
| JP | H10-151836 A | 6/1998 |
| JP | 2002-091247 A | 3/2002 |
| JP | 2002-116586 A | 4/2002 |
| JP | 2003-241590 A | 8/2003 |
| JP | 2004-347666 A | 12/2004 |
| JP | 2005-174156 A | 6/2005 |
| JP | 2005-202105 A | 7/2005 |
| JP | 2006-34973 A | 2/2006 |
| JP | 2006-058731 A | 3/2006 |
| JP | 2008-307733 A | 12/2008 |
| JP | 2009-302940 A | 12/2009 |
| JP | 2010-117423 A | 5/2010 |
| JP | 2011-037109 A | 2/2011 |

* cited by examiner

| NORMAL STARTUP | HIBERNATION STARTUP | DRAM ENERGIZATION STARTUP |
|---|---|---|
| 30 SECONDS | 15 SECONDS | 5 SECONDS |

~301

| STIRRING OPERATION |
|---|
| 10 SECONDS |

~302

| DENSITY ADJUSTMENT 1 | DENSITY ADJUSTMENT 2 | DENSITY ADJUSTMENT 3 |
|---|---|---|
| 10 SECONDS | 15 SECONDS | 5 SECONDS |

IMAGE FORMING APPARATUS, METHOD, AND MEDIUM FOR AFFECTING STARTUP

CROSS-REFERENCE TO RELATED APPLICATIONS

This application is a Continuation of International Patent Application No. PCT/JP2012/078833, filed Nov. 7, 2012, which claims the benefit of Japanese Patent Application No. 2011-244671, filed Nov. 8, 2011, both of which are hereby incorporated by reference herein in their entirety.

TECHNICAL FIELD

The present invention relates to startup of an image forming apparatus.

BACKGROUND ART

Recently, as image forming apparatuses have become multifunctional, systems have become complicated, resulting in a tendency to increase the time period for startup of software. To solve this problem, a technique for reducing a time period for startup of software has been established. In this technique, when the power supply switch of an image forming apparatus is turned off, only a DRAM is energized. After that, when the power supply switch is turned on, the state is changed from the state in which only the DRAM is energized to the previous state before the power supply switch was turned off (hereinafter, referred to as DRAM energization startup).

For example, as described in PTL 1, a technique for reducing a time period for startup of software is established. In this technique, when the power supply switch of an image forming apparatus is turned off, a DRAM image is stored in a nonvolatile storage area (for example, a hard disk). When the power supply switch is turned on, this image is loaded to a DRAM and the previous state before the power supply switch was turned off is restored (hereinafter, referred to as hibernation startup).

CITATION LIST

Patent Literature

PTL 1 Japanese Patent Laid-Open No. 5-85020

An image forming apparatus includes a job controller unit (hereinafter, referred to as a controller) which generates and processes a normal job, and a printer unit (hereinafter, referred to as a printer) which performs a printing process. The controller and the printer have respective CPUs, and execute pieces of software which are independent of each other.

As described above, a fast startup technique for software is being achieved which can be used for the software for the controller.

In the software for the printer, initialization of devices is mainly performed. Therefore, it is difficult to apply the startup reducing technique for software, as it is, to the software for the printer. Thus, under the present conditions, only the controller starts up fast, so that it waits for startup of the printer. As a result, there has arisen a problem in that startup of the entire image forming apparatus takes time.

The present invention is made to solve the above-described problem, and an object thereof is to provide a mechanism which enables fast startup of the entire image forming apparatus to be achieved.

SUMMARY OF INVENTION

In the present invention, there is provided an image forming apparatus including a controller and an image forming unit. The apparatus has multiple startup modes including a first startup mode and a second startup mode as startup modes for the controller. The second startup mode is configured in such a way that a startup time period for the second startup mode is shorter than a startup time period for the first startup mode. The apparatus includes setting means, first control means, and second control means. The setting means sets either one startup mode from the multiple startup modes in accordance with an instruction from a user. The first control means starts up the controller in the startup mode that is set by the setting means, when the image forming apparatus is to be started up. When the image forming apparatus is to be started up, the second control means starts up the image forming unit by performing a predetermined initialization process in the case where the first startup mode is set by the setting means, and starts up the image forming unit without performing the predetermined initialization process in the case where the second startup mode is set by the setting means.

Further features of the present invention will become apparent from the following description of exemplary embodiments with reference to the attached drawings.

DESCRIPTION OF EMBODIMENTS

Best modes for carrying out the present invention will be described below by using the drawings. Components described in the embodiments are merely examples, and the scope of the present invention is not limited only to those.

First Embodiment

Figure 1A:
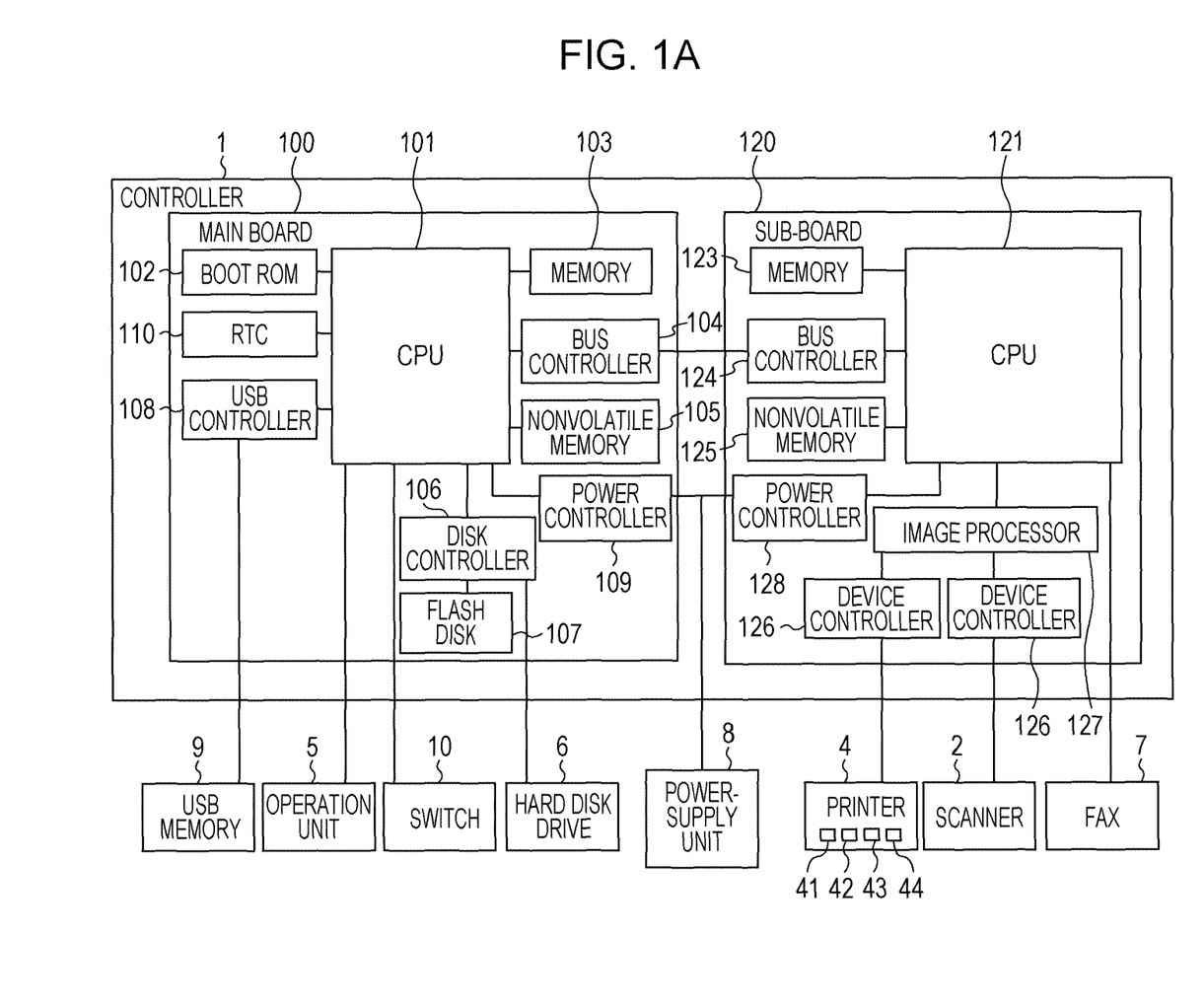
FIGS. 1A and 1B are block diagrams illustrating an exemplary configuration of an image forming apparatus according to an embodiment of the present invention.

FIG. 1A is a block diagram illustrating an exemplary configuration of an image forming apparatus according to an embodiment of the present invention.

In FIG. 1A, reference numeral 1 denotes a controller of the image forming apparatus, and the controller 1 includes a main board 100 and a sub-board 120.

The main board 100 is a so-called general-purpose CPU system. A CPU 101 controls the entire main board 100. A boot ROM 102 records boot programs in a computer-readable manner. A memory 103 is a main memory used as a work memory by the CPU 101.

A bus controller 104 has a bridge function for an external bus. A nonvolatile memory 105 is a storage in which data can be maintained without being lost even when power supply is interrupted. An RTC 110 is a clock which operates using power supplied from a battery, even when power supply to the main board 100 is interrupted.

A disk controller 106 controls a storage unit. A USB controller 108 controls a USB. A flash disk 107 is a relatively low-capacity storage unit, e.g., a solid state drive (SSD), including a semiconductor device.

A USB memory 9, an operation unit 5, and a hard disk drive 6 are connected to the main board 100. The hard disk drive 6 is not necessarily a hard disk as long as it is a nonvolatile storage, and any type of nonvolatile storage may be employed as the hard disk drive 6.

The sub-board 120 includes a relatively small general-purpose CPU system and image processing hardware. A CPU 121 controls the entire sub-board 120. The CPU 121 uses a memory 123 as a work memory. A bus controller 124 has a bridge function for an external bus.

A nonvolatile memory 125 is a storage in which data can be maintained without being lost even when power supply is interrupted. An image processor 127 performs real-time digital image processing.

A scanner (scanner unit) 2 and a printer (printer unit) 4 receives/transmits digital image data via device controllers 126. The CPU 121 directly controls a fax (facsimile unit) 7.

A power-supply unit 8 supplies power to the main board 100 and the sub-board 120. A power controller 109 controls power supplied from the power-supply unit 8 so that the power is supplied to the units on the main board 100 which need the power. A power controller 128 controls power supplied from the power-supply unit 8 so that the power is supplied to the units on the sub-board 120 which need the power.

Power is supplied to, for example, the USB memory 9, the operation unit 5, the hard disk drive 6, the printer 4, the scanner 2, and the fax 7 via the controller 1.

A switch 10 is a power supply switch with which a user performs an operation of turning power supply off/on. When the switch 10 is operated, the CPU 101 is interrupted. When the CPU 101 detects the interrupt, the CPU 101 controls the power controller 109 in accordance with the state of the CPU 101. The CPU 121 detects the operation on the switch 10, via the bus controllers 104 and 124, and controls the power controller 128.

FIG. 1A is a block diagram providing simplified illustration. For example, the CPU 101, the CPU 121, and the like include a large number of pieces of CPU peripheral hardware, such as a chipset, a bus bridge, and a clock generator. However, these pieces of CPU peripheral hardware are not necessary to be illustrated in terms of the level of the description, and are omitted in the diagram. Therefore, this block configuration is not limited to the present invention.

The printer 4 includes a CPU 41, a ROM 42, a RAM 43, and a nonvolatile storage 44 therein. The CPU 41 executes programs stored in the ROM 42 by using the RAM 43, thereby achieving various operations. The printer 4 stores the startup mode for the controller 1 described below in the nonvolatile storage 44.

Operations of the controller 1 will be described below by taking image copying by means of a sheet of paper, as an example.

When a user transmits, from the operation unit 5, an instruction to copy an image, the CPU 101 detects this instruction and instructs the scanner 2 to read out an image, via the CPU 121. Upon reception of the instruction to read out an image, the scanner 2 performs optical scanning on a paper document, and converts the optical data into digital image data which is transmitted via the device controller 126 to the image processor 127. Upon reception of the digital image data, the image processor 127 performs DMA transfer of the digital image data via the CPU 121 to the memory 123 in which the digital image data is temporarily stored.

When the CPU 101 determines that a certain amount or the entirety of the digital image data is stored in the memory 123, the CPU 101 transmits an instruction to output an image, via the CPU 121 to the printer 4, and notifies the image processor 127 of the position (address) of the image data on the memory 123. The image processor 127 which has received the instruction to output an image transmits the image data stored at the position on the memory 123 which is obtained through the notification, via the device controller 126 to the printer 4 in accordance with a synchronizing signal received from the printer 4.

When the printer 4 receives the image data via the device controller 126, the printer 4 prints the image data on a sheet of paper.

In the case where more than one copy is to be printed, the CPU 101 stores the image data on the memory 123 into the hard disk drive 6. When the second copy and its subsequent copies are to be printed, instead of receiving the image data from the scanner 2, the CPU 101 exerts control so as to transmit the image data stored in the hard disk drive 6 to the printer 4, and to perform printing in the printer 4.

The startup mode for a controller (control unit) will be briefly described. In a normal startup mode (first startup mode), programs are deployed in volatile storage means to start up the controller. In a DRAM energization startup mode (second startup mode), a memory image stored in volatile storage means is used to start up the controller. In a hibernation startup mode (third startup mode), a memory image stored in nonvolatile storage means is read out to volatile storage means to start up the controller.

The state of the power in the image forming apparatus in the case where the controller 1 is turned off in the DRAM energization startup mode will be described below by using FIG. 1B.

Figure 1B:
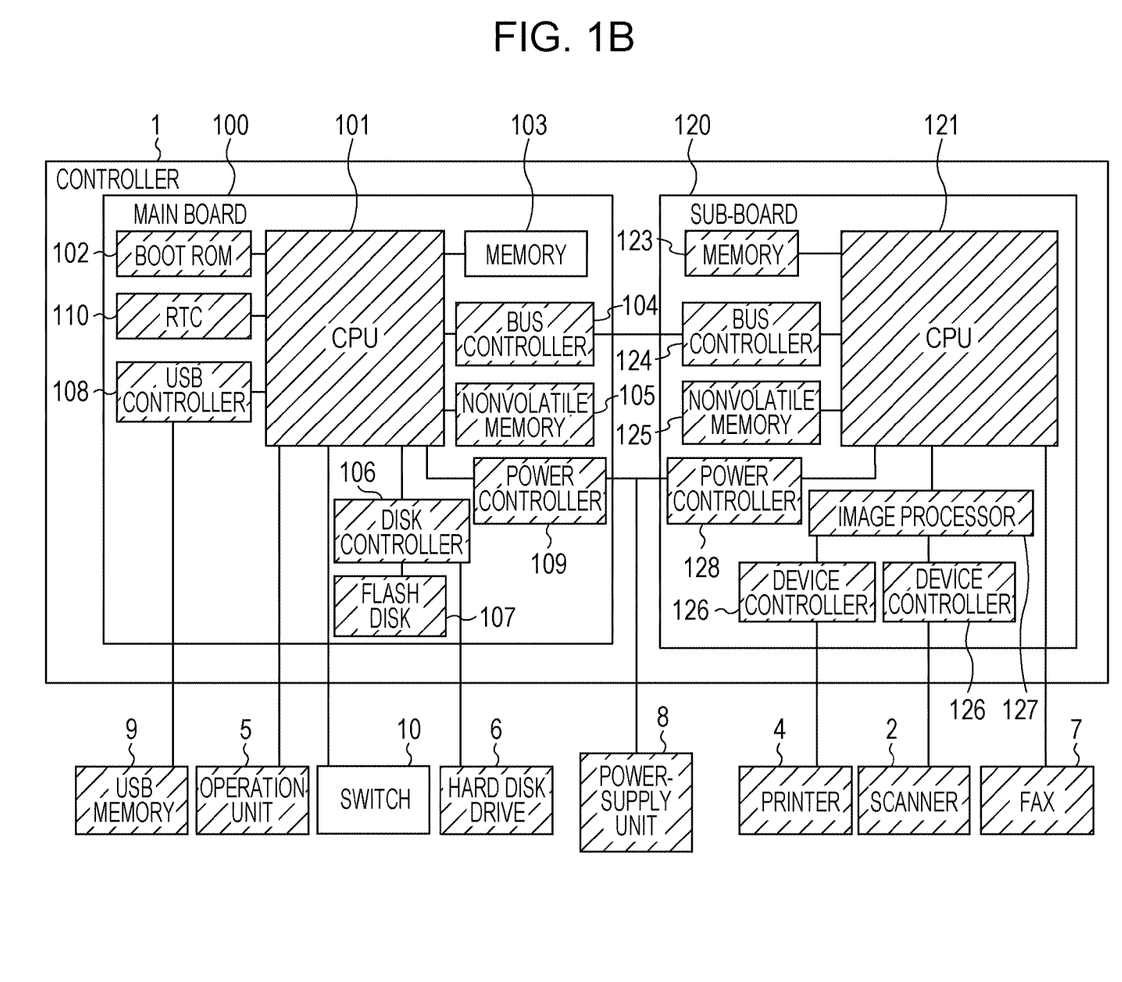

FIG. 1B is a diagram illustrating an exemplary state of the power in the image forming apparatus in the case where the controller 1 is turned off in the DRAM energization startup mode.

As illustrated in FIG. 1B, when the controller 1 is turned off in the DRAM energization startup mode, the image forming apparatus enters the state in which only the memory 103 and the switch 10 of the main board 100 of the controller 1 are energized. The memory image which had been obtained before the power was turned off is stored in the memory 103, achieving fast startup of the controller 1 when the power is turned on. That is, in the DRAM energization startup mode, the controller 1 continues to supply power to the memory 103 of the controller 1 even while the switch 10 is off. When the switch 10 is turned on, the controller 1 uses the data stored in the memory 103 to restore the previous state before the switch 10 was turned off.

In contrast, when the controller 1 is turned off in the hibernation startup mode, the image forming apparatus enters the state in which energization of all of the devices of the image forming apparatus is interrupted. A memory image before the power was turned off is stored in the hard disk drive 6 or the flash disk 107, and is deployed in the memory 103 by using DMA transfer upon startup, achieving fast startup of the controller 1. That is, in the hibernation startup mode, when the switch 10 is turned off, the controller 1 stores, in the flash disk 107, the data stored in the memory 103. When the switch 10 is turned on, the controller 1 loads the data stored in the flash disk 107 to the memory 103 to restore the previous state before the switch 10 was turned off.

Comparing startup in the hibernation startup mode with startup in the DRAM energization startup mode, the power consumption in the hibernation startup mode during the power-off sate is typically smaller than that in the DRAM energization startup mode by the amount corresponding to the energization of the memory 103 and the switch 10. However, in the case of startup in the hibernation startup mode, the startup time period is longer than that in the DRAM energization startup mode by the time period for the deployment of the memory image from the hard disk drive 6 or the flash disk 107 to the memory 103.

In the case of startup in the normal startup mode, since the CPU 101 sequentially reads out the image from the hard disk drive 6 or the flash disk 107 to the memory 103, the startup takes time. On the other hand, in the case of startup in the normal startup mode, the controller 1 is always started up from the initial state every time, ensuring operational stability.

In the case where the image forming apparatus is to be started up fast with a small amount of power being consumed during the power-off state, the DRAM energization startup mode is used. In the case where the image forming apparatus is to be started up fast without power being consumed during the power-off state, the hibernation startup mode is used. In the case where startup may take time, the normal startup mode is used.

The operation unit 5 is used to switch the mode among the normal startup mode, the DRAM energization startup mode, and the hibernation startup mode. The features of the above-described startup modes are displayed in a startup-mode switching menu on the display unit provided for the operation unit 5, and the operation unit 5 receives a setting for the startup mode through selection performed by a user. Hereinafter, the DRAM energization startup mode and the hibernation startup mode are collectively called a fast startup mode. The DRAM energization startup mode is also called a first fast startup mode, and the hibernation startup mode is also called a second fast startup mode.

Figure 2:
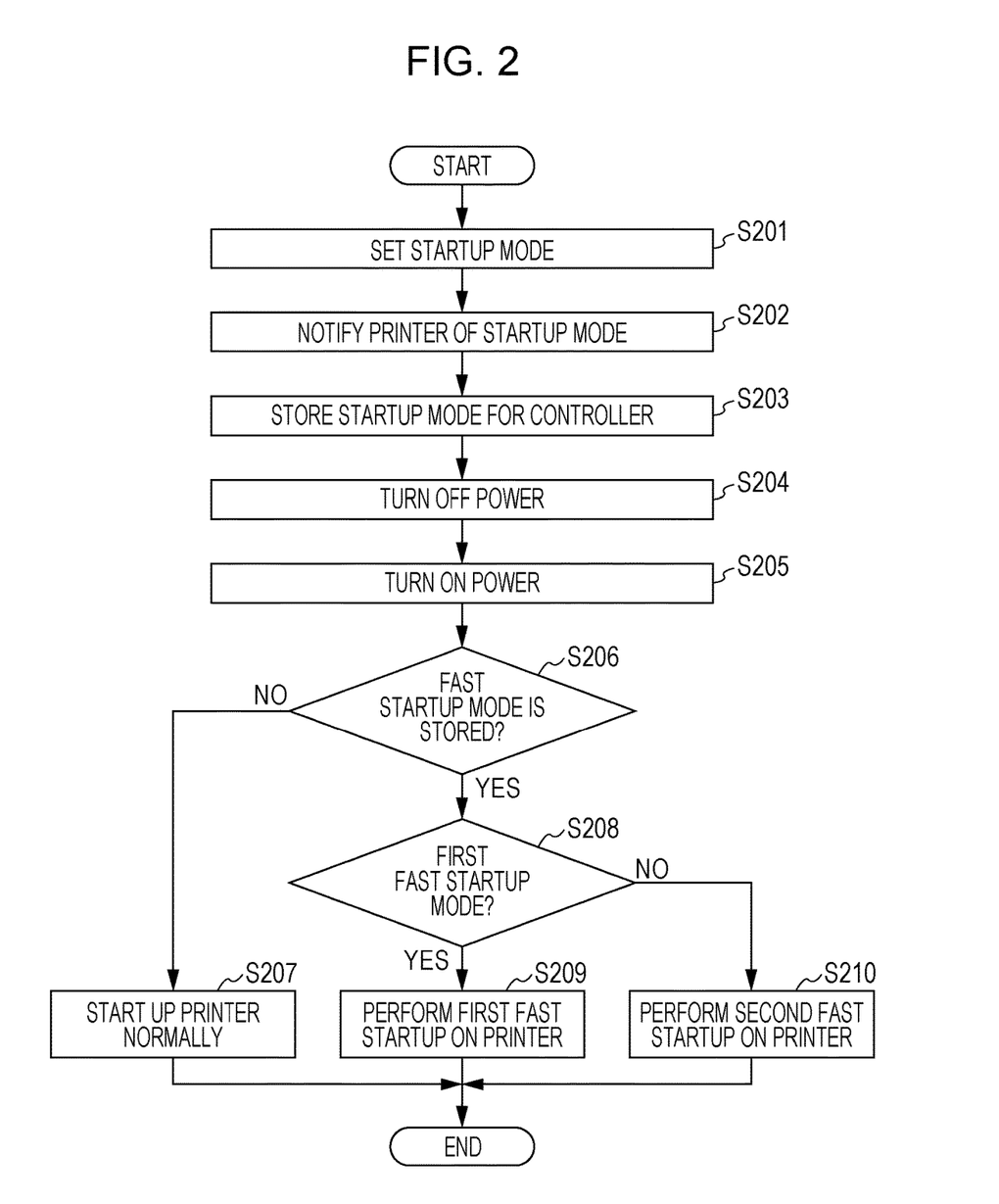
FIG. 2 is a flowchart of exemplary operations of a controller 1 and a printer 4 in an image forming apparatus according to a first embodiment of the present invention.

The operations of the image forming apparatus according to the first embodiment of the present invention will be described below by using FIG. 2. FIG. 2 is a flowchart of exemplary operations of the controller 1 and the printer 4 in the image forming apparatus according to the first embodiment of the present invention. The operations of the controller 1 are achieved with the CPU 101 of the controller 1 reading out programs recorded in the boot ROM 102 in a computer-readable manner and executing the programs. The operations of the printer 4 are achieved with the CPU 41 of the printer 4 reading out programs recorded in the ROM 42 in a computer-readable manner and executing the programs.

In step S201, upon detection of a setting of the startup mode for the controller 1 which is performed by a user by using the operation unit 5, the CPU 101 stores the startup mode which has been set, in the nonvolatile memory 105. In the next startup, the CPU 101 exerts control so as to start up the controller 1 by using this startup mode.

In step S202, the CPU 101 notifies the CPU 121 of the startup mode that has been set in step S201, via the bus controllers 104 and 124. The CPU 121 which has received this notification notifies the printer 4 of the startup mode received from the CPU 101, via the device controller 126.

Upon reception of the notification about the startup mode from the CPU 121, the CPU 41 of the printer 4 stores the startup mode received from the CPU 121 in the nonvolatile storage 44 (in step S203).

When a user operates the switch 10 and turns off the switch 10, the CPU 101 detects the turn-off of the switch 10, performs a necessary end process, and turns off the power of the image forming apparatus through the power controller 109 (in step S204).

When a user operates the switch 10 and turns on the switch 10 (in step S205), power is supplied to the units including the controller 1 and the printer 4. In the units including the controller 1 and the printer 4, execution of various necessary startup processes is started.

In step S206, the CPU 41 of the printer 4 reads out the startup mode for the controller 1 which has been stored in the nonvolatile storage 44 in step S203, and determines whether or not the startup mode is a fast startup mode.

If it is determined that the startup mode for the controller 1 is not a fast startup mode, that is, the startup mode is the normal startup mode (No in step S206), the CPU 41 of the printer 4 performs normal startup in which all of the various initialization operations of the printer 4 are performed (in step S207).

In step S206, if it is determined that the startup mode for the controller 1 which has been stored in the nonvolatile storage 44 in step S203 is a fast startup mode (Yes), the CPU 41 of the printer 4 performs fast startup in which the printer 4 changes the various initialization operations (in steps S208 to S210).

In step S208, the CPU 41 of the printer 4 determines whether or not the startup mode for the controller 1 which has been stored in the nonvolatile storage 44 in step S203 is the first fast startup mode.

If it is determined that the startup mode for the controller 1 is the first fast startup mode, that is, the DRAM energization startup mode (Yes in step S208), the CPU 41 of the printer 4 performs first fast startup (in step S209).

In step S208, if it is determined that the startup mode for the controller 1 which has been stored in the nonvolatile storage 44 in step S203 is not the first fast startup mode, that is, the second fast startup mode which is the hibernation startup mode (No), the CPU 41 of the printer 4 performs second fast startup (in step S210).

The notification about the startup mode which is transmitted from the controller 1 to the printer 4 and which is described in step S202 can be transmitted during the process in step S204 or just after step S205. When the notification about the startup mode is transmitted just after step S205, the operation in step S203 in which the startup mode is stored in the nonvolatile storage is not necessary. In this case, the notification about the startup mode which is not transmitted just after step S205 as earlier as possible makes it difficult to switch the startup process of the printer 4.

Figure 3:
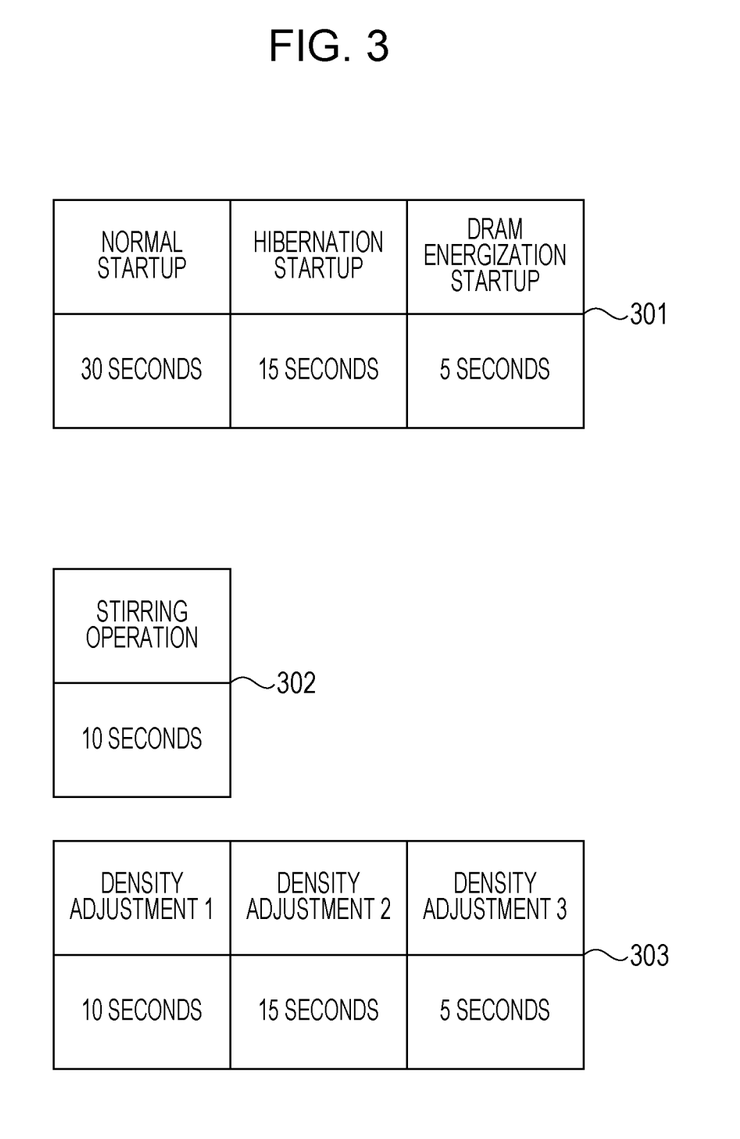
FIG. 3 is a diagram illustrating an exemplary startup time period for each of startup modes for the controller 1 and exemplary initialization process time periods for the printer 4.

FIG. 3 is a diagram illustrating an exemplary startup time period for each of the startup modes for the controller 1 and exemplary initialization process time periods for the printer 4.

In FIG. 3, reference numeral 301 denotes exemplary startup time periods for the startup modes for the controller 1. In the example, the startup time period for the normal startup mode is set to 30 seconds. The startup time period for the hibernation startup mode is set to 15 seconds, and the startup time period for the DRAM energization startup mode is set to 5 seconds. These startup modes correspond to the startup mode transmitted from the controller 1 to the printer 4 in step S202 in FIG. 2. The printer 4 performs various initialization operations in accordance with the startup time period for the received startup mode for the controller 1.

Reference numerals 302 and 303 denote examples of various initialization operations of devices in the printer 4. In the present embodiment, the initialization operations of the printer 4 include two groups of operations, that is, a toner stirring operation 302 and toner density adjustments 303.

The operating time period (a time period from the start of an operation to the end of the operation) for the toner stirring operation 302 is 10 seconds.

The reference numeral 303 denotes toner density adjustments. The methods for density adjustment include three types (density adjustments 1 to 3) whose operating time periods are not equal. The operating time period for the density adjustment 1 is 10 seconds; the density adjustment 2, 15 seconds; and the density adjustment 3, 5 seconds.

The density adjustment operations (density adjustments 1 to 3) included in the operation group 303 cannot be performed in parallel. The stirring operation 302 and the density adjustment operation group 303 can be performed in parallel.

For example, in the case where the startup mode transmitted from the controller 1 to the printer 4 in step S202 in FIG. 2 is the "normal startup mode", startup of the controller 1 takes 30 seconds. Therefore, the printer 4 performs startup in which all initialization operations of the stirring operation, the density adjustment 1, the density adjustment 2, and the density adjustment 3 are performed (30 seconds in total). Thus, the entire image forming apparatus is started up in 30 seconds.

In the case where the startup mode transmitted from the controller 1 to the printer 4 in step S202 in FIG. 2 is the "hibernation startup mode", startup of the controller 1 takes 15 seconds. Therefore, the printer 4 performs startup in which some of the initialization operations are skipped. Specifically, the printer 4 is started up by skipping the density adjustment 1 and the density adjustment 3, or by skipping the density adjustment 2. Thus, the printer 4 can be started up fast in 15 seconds (which accord with the startup time period for the controller 1). Accordingly, the entire image forming apparatus can be started up fast in 15 seconds.

In the case where the startup mode transmitted from the controller 1 to the printer 4 in step S202 in FIG. 2 is the "DRAM energization startup mode", startup of the controller 1 takes 5 seconds. Therefore, the printer 4 performs startup in which some of the initialization operations are skipped. Specifically, the printer 4 is started up by skipping the stirring operation, the density adjustment 1, and the density adjustment 2 and executing only the density adjustment 3. Thus, the printer 4 can be started up fast in 5 seconds (which accord with the startup time period for the controller 1). Accordingly, the entire image forming apparatus can be started up fast in 5 seconds.

That is, according to the present embodiment, the initialization operations of the printer 4 include multiple operation groups which can be performed in parallel. Each of the operation groups includes one or more operations which cannot be performed in parallel. When the initialization operations of the printer 4 are to be changed, the CPU 41 of the printer 4 skips some or all of the operations in some or all of the operation groups in accordance with the startup time period for the controller 1. Thus, the printer 4 can be started up fast. All of the initialization operations of the printer 4 may be skipped.

Alternatively, some or all of the initialization operations of the printer 4 may be replaced with other operations having shorter execution time periods. In addition, some of the initialization operations of the printer 4 may be replaced with other operations having shorter execution time periods, and some may be skipped (a configuration in which replacement of operations is combined with skipping of operations). That is, as long as the initialization operations of the printer 4 are changed in accordance with the startup time period for the controller 1, any configuration is employable.

As described above, by notifying the printer 4 of the startup mode for the controller 1, the printer 4 changes the initialization operations in accordance with the startup time period for the controller 1, achieving fast startup. As a result, it is possible to solve the issue in which the startup time period for the entire image forming apparatus takes a long time because only the controller starts up fast and waits for completion of the startup of the printer, achieving fast startup of the entire image forming apparatus.

As described above, in the case where the startup mode for the controller 1 is a fast startup mode when the switch 10 is turned on, the CPU 41 of the printer 4 changes the initialization operations of the printer 4 in accordance with the startup time period for the controller which is required when startup is performed in the fast startup mode, and starts up the printer 4. For example, the CPU 41 of the printer 4 changes (skips and/or replaces) the initialization operations of the printer 4 so that the startup time period for the printer 4 does not exceed the startup time period for the controller 1 which is required when startup is performed in the fast startup mode.

The CPU 41 of the printer 4 may change (skip and/or replace) the initialization operations of the printer 4 so that the startup time period for the controller 1 which is required when startup is performed in the fast startup mode is less than a predetermined time period (for example, less than 5 seconds).

The CPU 41 of the printer 4 may change (skip and/or replace) the initialization operations of the printer 4 so that the difference between the startup time period for the controller 1 which is required when startup is performed in the fast startup mode and the startup time period for the printer 4 is minimized. For example, assume that the startup time period for the controller 1 in the hibernation startup mode is "13 seconds". In this case, the printer 4 performs startup in which the density adjustment 1 and the density adjustment 3 are skipped or in which the density adjustment 2 is skipped. Thus, the printer 4 can be started up fast in 15 seconds such that the difference between the startup time period for the controller 1 and the startup time period for the printer 4 is minimized although the startup time period for the printer 4 exceeds the startup time period for the controller 1.

Second Embodiment

According to the first embodiment, in the case where a fast startup mode is set for the controller 1, the printer 4 always performs fast startup in which the initialization operations are changed. In the case where the initialization operations of the printer 4 are changed (skipped and/or replaced), when the power-off time period is long, the toner state or the like may cause, for example, the color to be changed. According to a second embodiment, in the case where the power-off time period is longer than a predetermined time period, the printer 4 is started up by executing the normal startup operation without changing the initialization operations of the printer 4. The description will be made below in detail by using FIG. 4.

Figure 4:
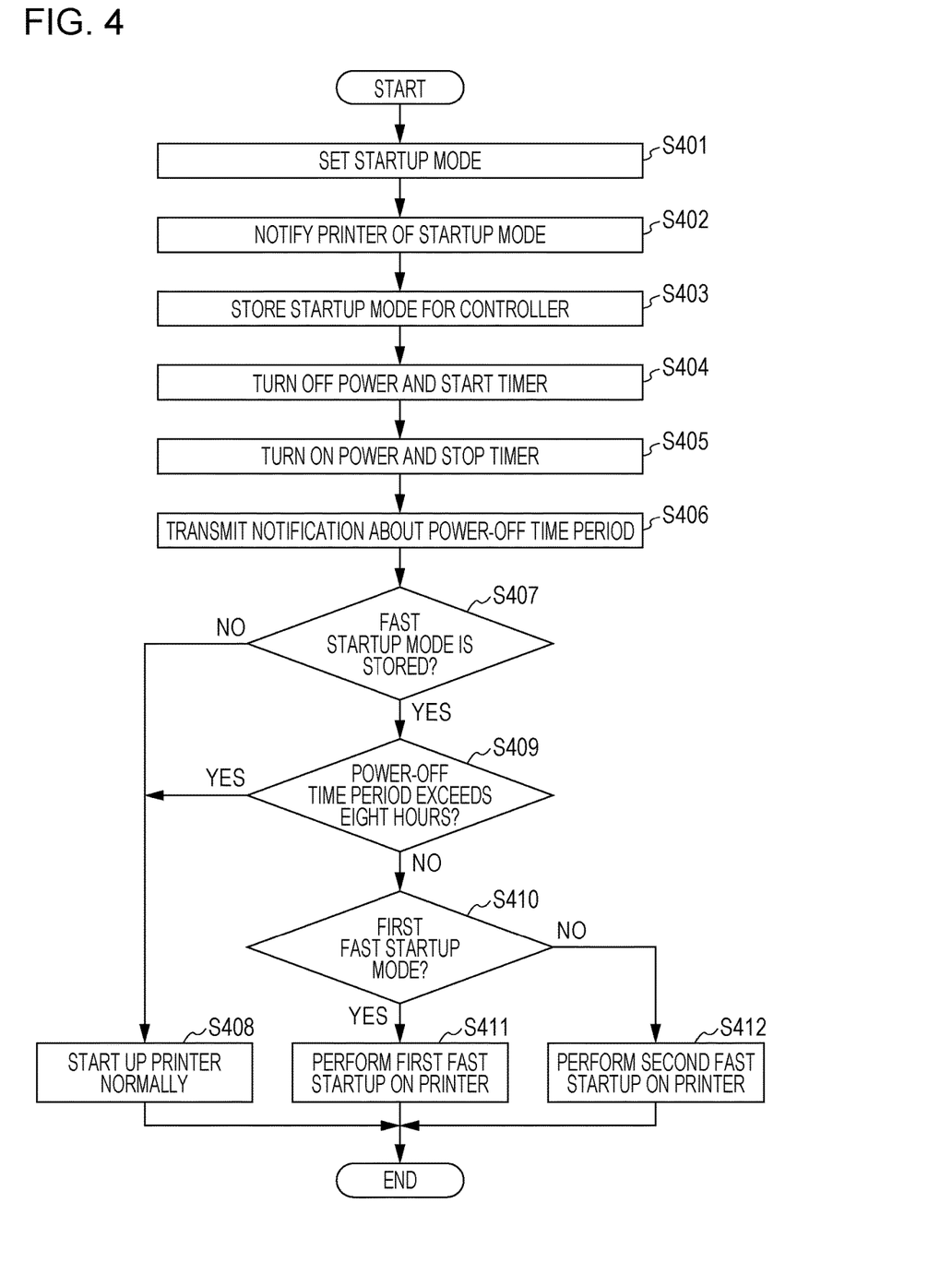
FIG. 4 is a flowchart of exemplary operations of a controller 1 and a printer 4 in an image forming apparatus according to a second embodiment of the present invention.

FIG. 4 is a flowchart of exemplary operations of the controller 1 and the printer 4 in the image forming apparatus according to the second embodiment of the present invention. The operations of the controller 1 are achieved with the CPU 101 of the controller 1 reading out programs recorded in the boot ROM 102 in a computer-readable manner and executing the programs. The operations of the printer 4 are achieved with the CPU 41 of the printer 4 reading out programs recorded in the ROM 42 in a computer-readable manner and executing the programs.

In step S401, upon detection of a setting of the startup mode for the controller 1 which is performed by a user by using the operation unit 5, the CPU 101 stores the startup mode which has been set, in the nonvolatile memory 105. In the next startup, the CPU 101 exerts control so as to start up the controller 1 by using this startup mode.

In step S402, the CPU 101 notifies the CPU 121 of the startup mode that has been set in step S401, via the bus controllers 104 and 124. The CPU 121 which has received this notification notifies the printer 4 of the startup mode received from the CPU 101, via the device controller 126.

Upon reception of the notification about the startup mode from the CPU 121, the CPU 41 of the printer 4 stores the startup mode received from the CPU 121 in the nonvolatile storage 44 (in step S403).

When a user operates the switch 10 and turns off the switch 10, the CPU 101 detects the turn-off of the switch 10, and starts the RTC 110 in order to measure the power-off time period of the image forming apparatus. Then, the CPU 101 performs a necessary end process, and turns off the power of the image forming apparatus through the power controller 109 (in step S404).

When a user operates the switch 10 and turns on the switch 10 (in step S405), power is supplied to the units including the controller 1 and the printer 4. In the units including the controller 1 and the printer 4, execution of various necessary startup processes is started. The CPU 101 of the controller 1 stops the RTC 110 which has been started in step S404.

In step S406, the CPU 101 calculates (obtains) the power-off time period indicating the time period in which the switch 10 is off (elapsed time from step S404 to step S405) on the basis of the timer value of the RTC 110, and notifies the CPU 121 of the power-off time period via the bus controllers 104 and 124. The CPU 121 which has received this notification notifies the printer 4 of the power-off time period received from the CPU 101, via the device controller 126.

In step S407, the CPU 41 of the printer 4 reads out the startup mode for the controller 1 which has been stored in the nonvolatile storage 44 in step S403, and determines whether or not the startup mode is a fast startup mode.

If it is determined that the startup mode for the controller 1 is not a fast startup mode, that is, the startup mode is the normal startup mode (No in step S407), the CPU 41 of the printer 4 performs normal startup in which all of the various initialization operations of the printer 4 are performed (in step S408).

In step S407, if it is determined that the startup mode for the controller 1 which has been stored in the nonvolatile storage 44 in step S403 is a fast startup mode (Yes), the CPU 41 of the printer 4 causes the process to proceed to step S409.

In step S409, the CPU 41 of the printer 4 determines whether or not the power-off time period received in step S406 exceeds a threshold. In the present embodiment, the threshold is set to eight hours. The threshold depends on the characteristics of the printer 4, and may be any time period. Several stages of thresholds may be also used.

If it is determined that the power-off time period exceeds the threshold (Yes in step S409), the CPU 41 of the printer 4 causes the process to proceed to step S408, and starts up the printer normally (in step S408). That is, in the case where the power-off time period exceeds the threshold, the CPU 41 of the printer 4 exerts control so as to not change the initialization operations of the printer 4 regardless of the startup mode for the controller 1.

If it is determined that the power-off time period does not exceed the threshold (No in step S409), the CPU 41 of the printer 4 performs fast startup in which the printer 4 changes the various initialization operations (in steps S410 to S412).

In step S410, the CPU 41 of the printer 4 determines whether or not the startup mode for the controller 1 which has been stored in the nonvolatile storage 44 in step S403 is the first fast startup mode.

If it is determined that the startup mode for the controller 1 is the first fast startup mode, that is, the DRAM energization startup mode (Yes in step S410), the CPU 41 of the printer 4 performs first fast startup (in step S411).

In step S410, if it is determined that the startup mode for the controller 1 which has been stored in the nonvolatile storage 44 in step S403 is not the first fast startup mode, that is, the second fast startup mode which is the hibernation startup mode (No), the CPU 41 of the printer 4 performs second fast startup (in step S412).

As in the first embodiment, the notification about the startup mode which is transmitted from the controller 1 to the printer 4 and which is described in step S402 can be transmitted during the process in step S404, just after step S405, or in step S406. When the notification about the startup mode is transmitted just after step S405 or in step S406, the operation in step S403 in which the startup mode is stored in the nonvolatile storage is not necessary. In this case, the notification about the startup mode which is not transmitted just after step S405 or in step S406 as earlier as possible makes it difficult to switch the startup process of the printer 4.

As described above, the notification about the power-off time period of the controller 1 to the printer 4 can cause the initialization operations not to be changed in the case where the power-off time period is long and where the initialization operations of the printer 4 are necessary.

In the present embodiment, the configuration is described in which the RTC 110 of the controller 1 is used to measure the power-off time period. Alternatively, the printer 4 may be provided with a timer for measuring the power-off time period, and the power-off time period may be measured in the printer 4.

In the case where the power-off time period exceeds the threshold, the printer 4 is normally started up in step S408. Therefore, the controller 1 does not need to be started up fast. The threshold used for the determination of the printer 4 is stored in the nonvolatile memory 105 of the controller 1 in advance. When the power is turned on (in step S405), it is determined whether or not the power-off time period exceeds the threshold. When the power-off time period exceeds the threshold, the fast startup of the controller 1 is not performed. Thus, the startup of the controller 1 may be configured so as to accord with the startup of the printer 4.

Alternatively, the controller 1 may have a threshold which accords with the characteristics of the controller 1, may calculate the power-off time period in step S405, and may be started up normally instead of performing fast startup of the controller 1. In this case, in step S406, the controller 1 notifies the printer 4 of not performing fast startup, and the printer 4 is also started up normally.

As described above, in the case where the power-off time period exceeds the threshold, even when the startup mode for the controller 1 is a fast startup mode, the printer 4 does not change the initialization operations, and is normally started up by performing the normal initialization operations. Thus, when the power is off for a short time period, the entire image forming apparatus can be started up fast. In contrast, when the power is off for a long time period, the initialization operations of the printer 4 which are not changed are performed, and the state of the printer 4 is initialized, enabling prevention of the degradation of images that are to be formed. That is, both of fast startup and high-quality image formation may be achieved.

The above-described configuration and values of various data are not limited to those. It goes without saying that various configurations and values may be used in accordance with the usage and the purpose.

As described above, the embodiments are described. However, the present invention may be embodied, for example, as a system, an apparatus, a method, a program, or a recording medium. Specifically, the present invention may be applied to a system including multiple pieces of equipment, or may be applied to an apparatus constituted by one piece of equipment.

In addition, all of the configurations in which the above-described embodiments are combined with each other are included in the present invention.

The present invention enables a mechanism which achieves fast startup of the entire image forming apparatus to be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
   a switch that switches a power state of the image forming apparatus in accordance with an operation by a user;
   a printer that prints image data on a sheet and executes, in a case where the image forming apparatus is turned on in accordance with an operation of the switch, a plurality of initialization operations of the printer;
   a controller that controls the printer and includes at least one CPU; and
   a storage that stores settings of a first startup mode or a second startup mode as a startup mode of the controller, the startup mode of the controller being selected,
   wherein the CPU executes, in a case where the image forming apparatus is turned on and the first startup mode has been set as the startup mode of the controller, a first startup for starting up the controller using state information of the controller stored in the image forming apparatus before the image forming apparatus is turned on, and executes, in a case where the image forming apparatus is turned on and the second startup mode has been set as the startup mode of the controller, a second startup for starting up the controller,
   wherein, a starting up period of the controller in a case where the first startup is executed in accordance with the set first startup mode is shorter than a starting up period of the controller in a case where the second startup is executed in accordance with the set second startup mode,
   wherein,
   whether the printer executes the plurality of initialization operations of the printer or does not execute at least one of the plurality of initialization operations of the printer is determined based on at least the settings in the storage, and
   wherein, when the image forming apparatus is turned on in accordance with a turning-on operation of the switch,
   (a) in a case where the CPU executes the second startup of the controller, the printer executes the plurality of initialization operations of the printer, and
   (b) under at least a condition that the CPU executes the first startup of the controller, the printer does not execute at least one of the plurality of initialization operations of the printer, and
   wherein startup processes including the first startup and the second startup of the controller do not include execution of the plurality of initialization operations by the printer, and the execution of the plurality of initialization operations by the printer is a startup process of the printer.

2. The image forming apparatus according to claim 1, wherein the CPU executes the second startup by deploying, to a memory, data read from a nonvolatile storage.

3. The image forming apparatus according to claim 1, wherein the CPU executes the first startup, using a memory image deployed to a memory.

4. The image forming apparatus according to claim 1, wherein the plurality of initialization operations includes a toner stirring operation.

5. The image forming apparatus according to claim 1, wherein the plurality of initialization operations includes a toner density adjustment.

6. The image forming apparatus according to claim 1, wherein, if the storage stores the first startup mode, the CPU deploys, to a memory, a memory image indicating a state before the image forming apparatus is turned off, in accordance with a turning-off operation of the switch.

7. The image forming apparatus according to claim 6, wherein the memory of the image forming apparatus is a non-volatile memory.

8. The image forming apparatus according to claim 1, wherein, in a case where a time period during which the image forming apparatus is being turned off is longer than a predetermined time period, the CPU executes the at least one of the plurality of initialization operations even if the storage stores the first startup mode.

9. The image forming apparatus according to claim 1, wherein
   the controller is started up by deploying programs in the first startup mode, and the controller it is started up faster in the first startup mode than in the second startup mode by storing a memory image which has been obtained before the image forming apparatus is turned off and restoring a status of the controller, after the image forming apparatus is turned on, using the stored memory image, to a previous state before the image forming apparatus is turned off.

10. The image forming apparatus according to claim 1, wherein
    the first startup mode of the controller is a volatile-memory-energization startup mode or a hibernation startup mode of the controller and the second startup mode is a normal startup mode.

11. The image forming apparatus according to claim 1, wherein the printer executes a first printer-startup process where at least one of the plurality of initialization operations is not executed and a second printer-startup process where the plurality of the initialization operations are executed, and
- (a) in a case where the CPU executes the second startup of the controller, the printer executes the second printer-startup process, and
- (b) under at least a condition that the CPU executes the first startup of the controller, the printer executes the first printer-startup process.

12. A method for controlling an image forming apparatus comprising a switch that switches a power state of the image forming apparatus in accordance with an operation by a user, a printer that prints image data on a sheet and executes, in a case where the image forming apparatus is turned on in accordance with an operation of the switch, a plurality of initialization operations of the printer, and a controller including at least one CPU and controlling the printer, the method comprising:
- storing settings of a first startup mode or a second startup mode as a startup mode of the controller, the startup mode of the controller being selected by a user; and
- controlling, by the CPU, to execute, in a case where the image forming apparatus is turned on and the first startup mode has been set as the startup mode of the controller, a first startup for starting up the controller using state information of the controller stored in the image forming apparatus before the image forming apparatus is turned on, and execute, in a case where the image forming apparatus is turned on and the second startup mode has been set as the startup mode of the controller, a second startup for starting up the controller,
- wherein, a starting up period of the controller in a case where the first startup is executed in accordance with the set first startup mode is shorter than a starting up period of the controller in a case where the second startup is executed in accordance with the set second startup mode; and
- wherein,
- whether the printer executes the plurality of initialization operations of the printer or does not execute at least one of the plurality of initialization operations of the printer is determined based on at least the settings in the storage, and
- wherein, when the image forming apparatus is turned on in accordance with a turning-on operation of the switch,
  - (a) in a case where the second startup of the controller is executed by the CPU, the printer executes the plurality of initialization operations of the printer, and
  - (b) under at least a condition that the first startup of the controller is executed by the CPU, the printer does not execute at least one of the plurality of initialization operations of the printer, and
- wherein startup processes including the first startup and the second startup of the controller do not include execution of the plurality of initialization operations by the printer, and the execution of the plurality of initialization operations by the printer is a startup process of the printer.

13. A non-transitory storage medium storing a program causing an image forming apparatus comprising a switch that switches a power state of the image forming apparatus in accordance with an operation by a user, a printer that prints image data on a sheet and executes, in a case where the image forming apparatus is turned on in accordance with an operation of the switch, a plurality of initialization operations of the printer, and a controller including at least one CPU and controlling the printer to execute operations comprising:
- storing settings of a first startup mode or a second startup mode as a startup mode of the controller, the startup mode of the controller being selected by a user; and
- controlling, by the CPU, to execute, in a case where the image forming apparatus is turned on and the first startup mode has been set as the startup mode of the controller, a first startup for starting up the controller using state information of the controller stored in the image forming apparatus before the image forming apparatus is turned on, and execute, in a case where the image forming apparatus is turned on and the second startup mode has been set as the startup mode of the controller, a second startup for starting up the controller,
- wherein, a starting up period of the controller in a case where the first startup is executed in accordance with the set first startup mode is shorter than a starting up period of the controller in a case where the second startup is executed in accordance with the set second startup mode, and
- wherein,
- whether the printer executes the plurality of initialization operations of the printer or does not execute at least one of the plurality of initialization operations of the printer is determined based on at least the settings in the storage, and
- wherein, when the image forming apparatus is turned on in accordance with a turning-on operation of the switch,
  - (a) in a case where the second startup of the controller is executed by the CPU, the printer executes the plurality of initialization operations of the printing unit, and
  - (b) under at least a condition that the first startup of the controller is executed by the CPU, the printer does not execute at least one of the plurality of initialization operations of the printer, and
- wherein startup processes including the first startup and the second startup of the controller do not include execution of the plurality of initialization operations by the printer, and the execution of the plurality of initialization operations by the printer is a startup process of the printer.

* * * * *